June 13, 1961  E. A. WAHL  2,988,249
POWDER FEEDER
Filed Nov. 6, 1956  7 Sheets-Sheet 1
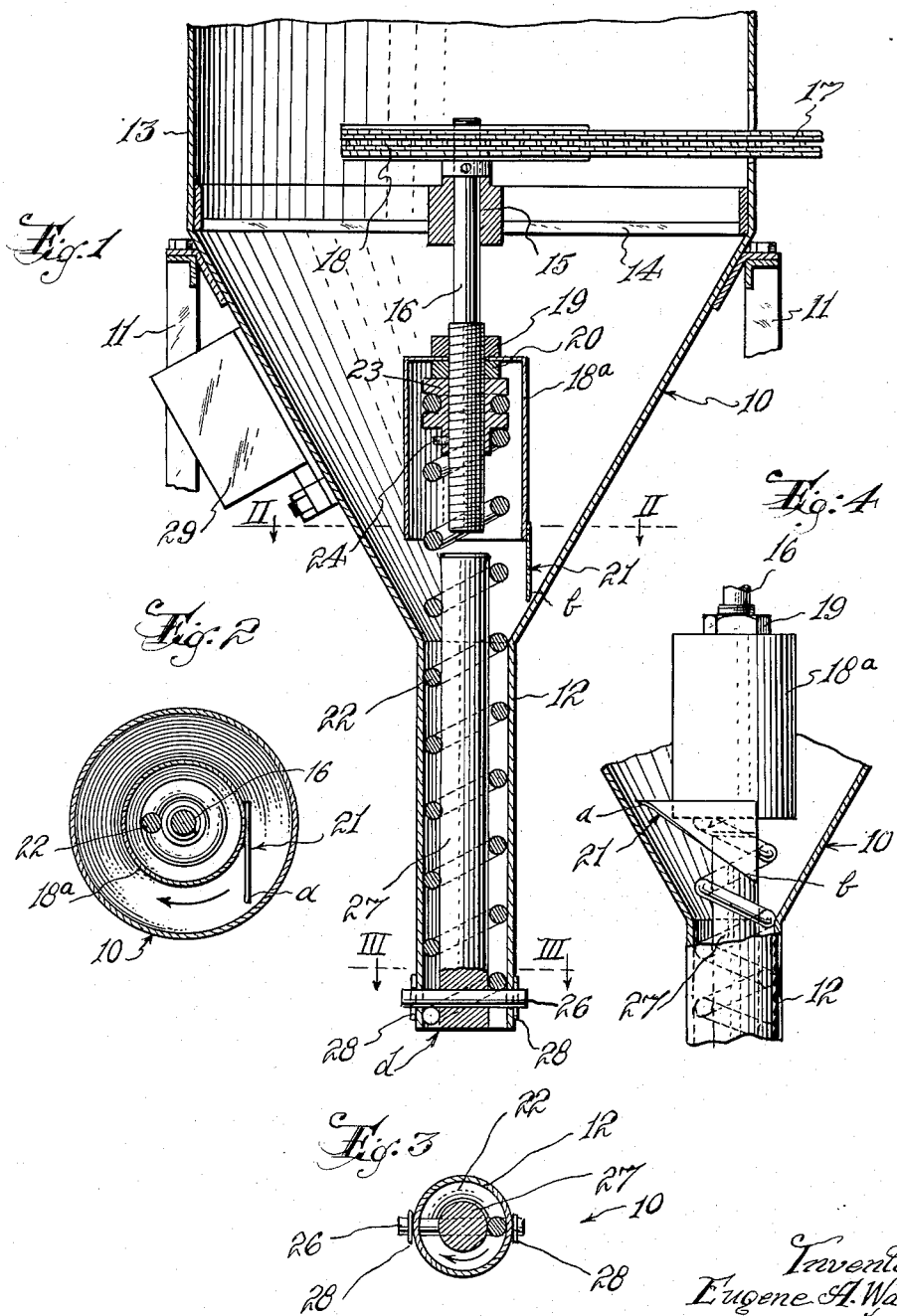
Inventor:
Eugene A. Wahl
By Rudolph J. Hurick
Attorney

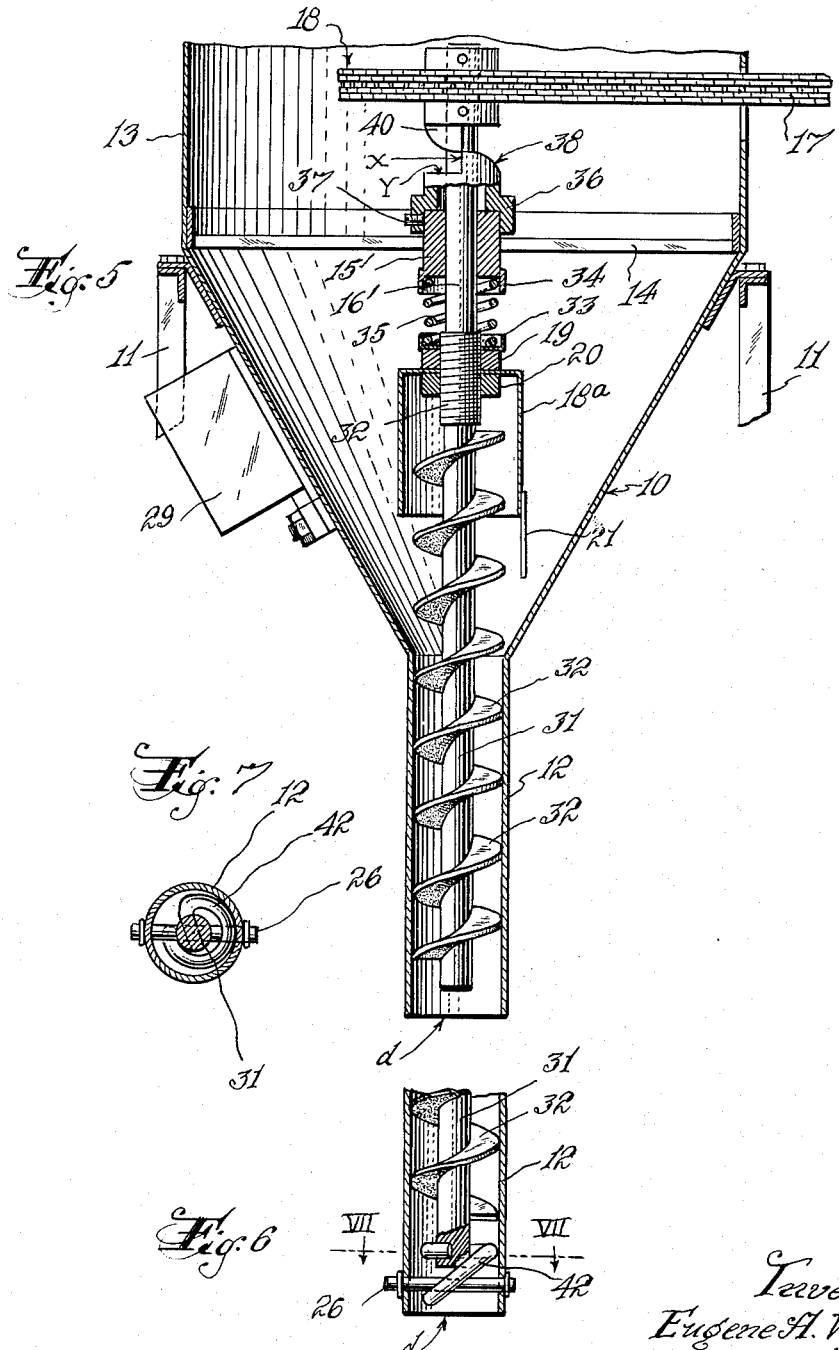

June 13, 1961  E. A. WAHL  2,988,249
POWDER FEEDER
Filed Nov. 6, 1956  7 Sheets-Sheet 3
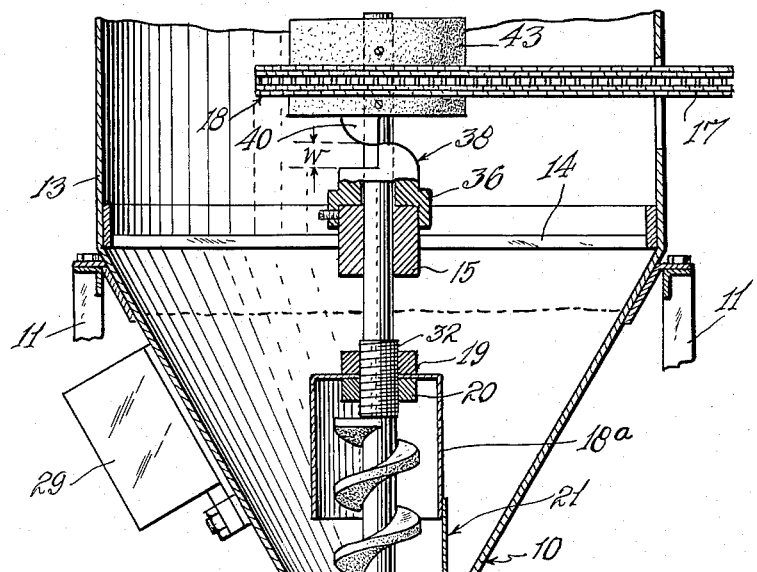
Fig. 8
Fig. 16
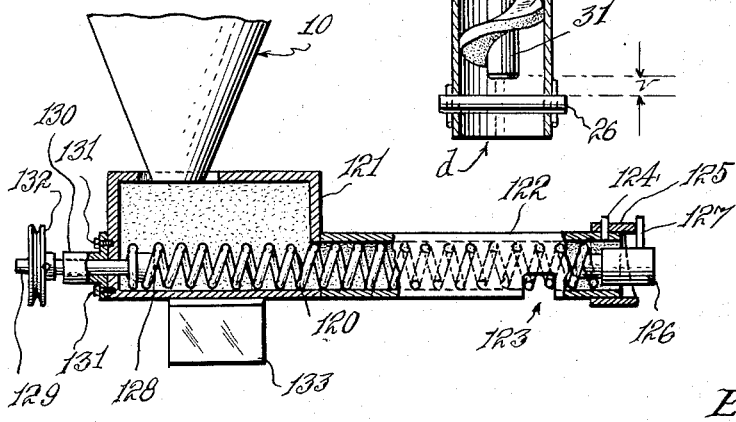
Fig. 17
Inventor:
Eugene A. Wahl
By Rudolph J. Jurick
Attorney.

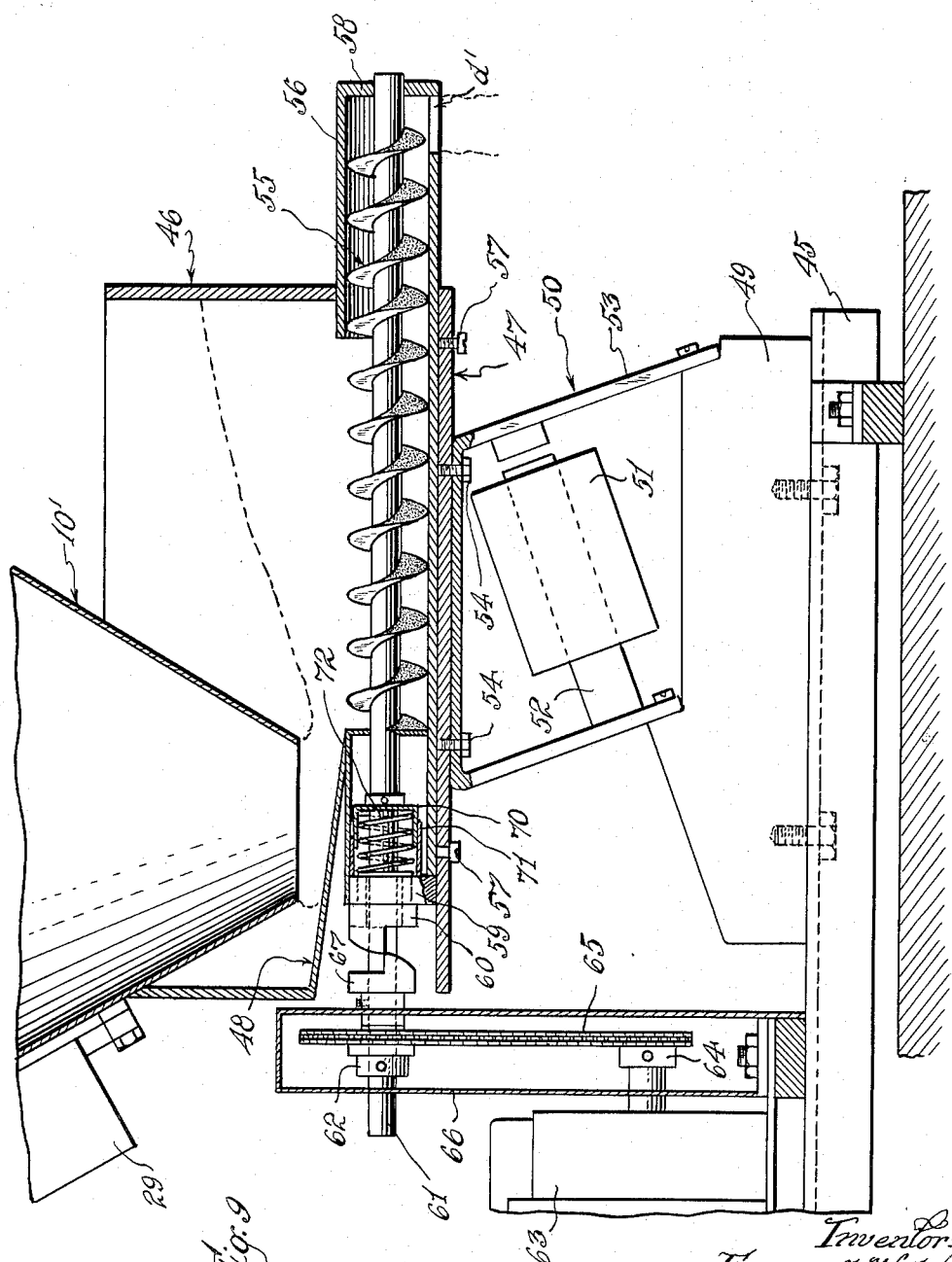

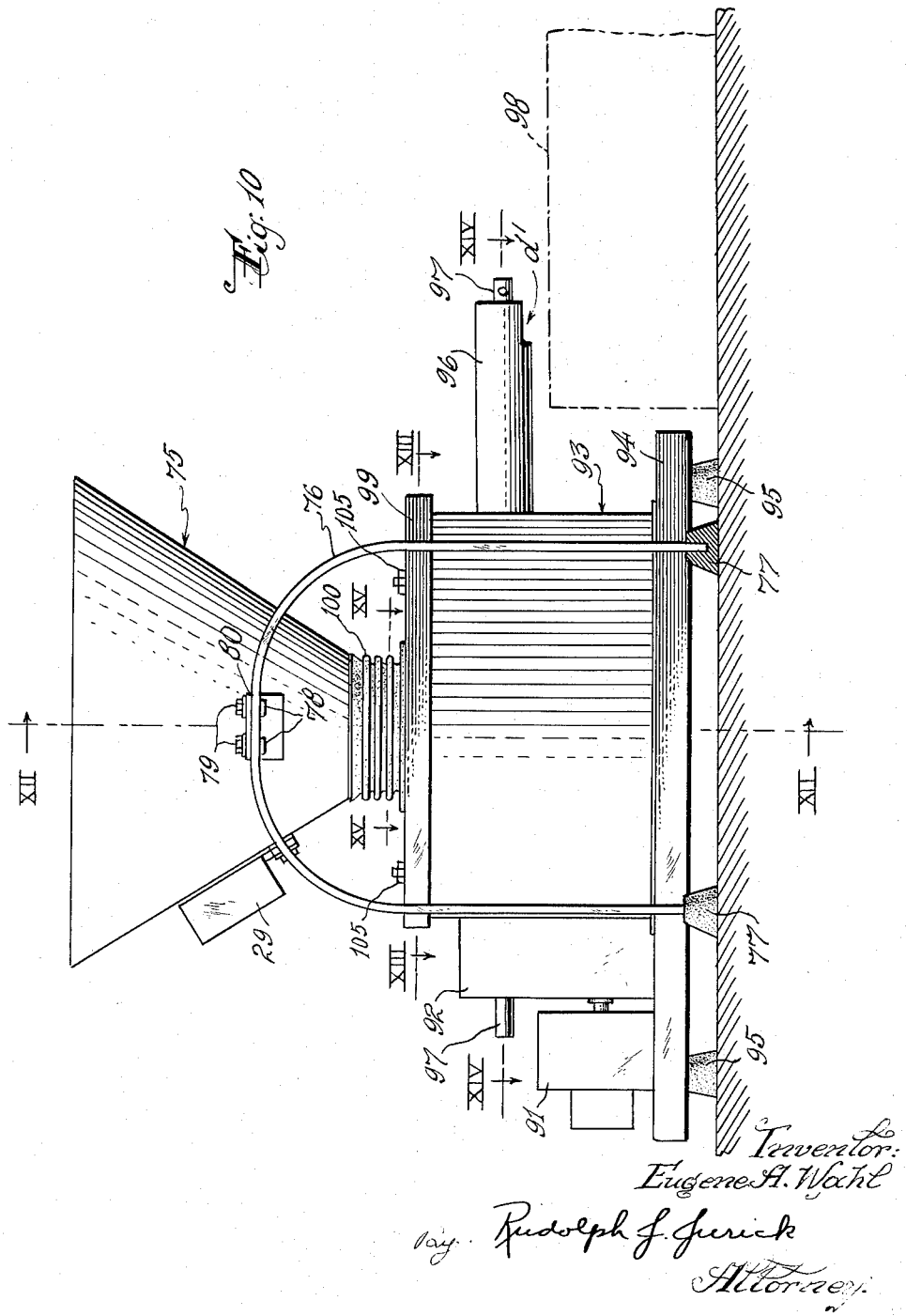

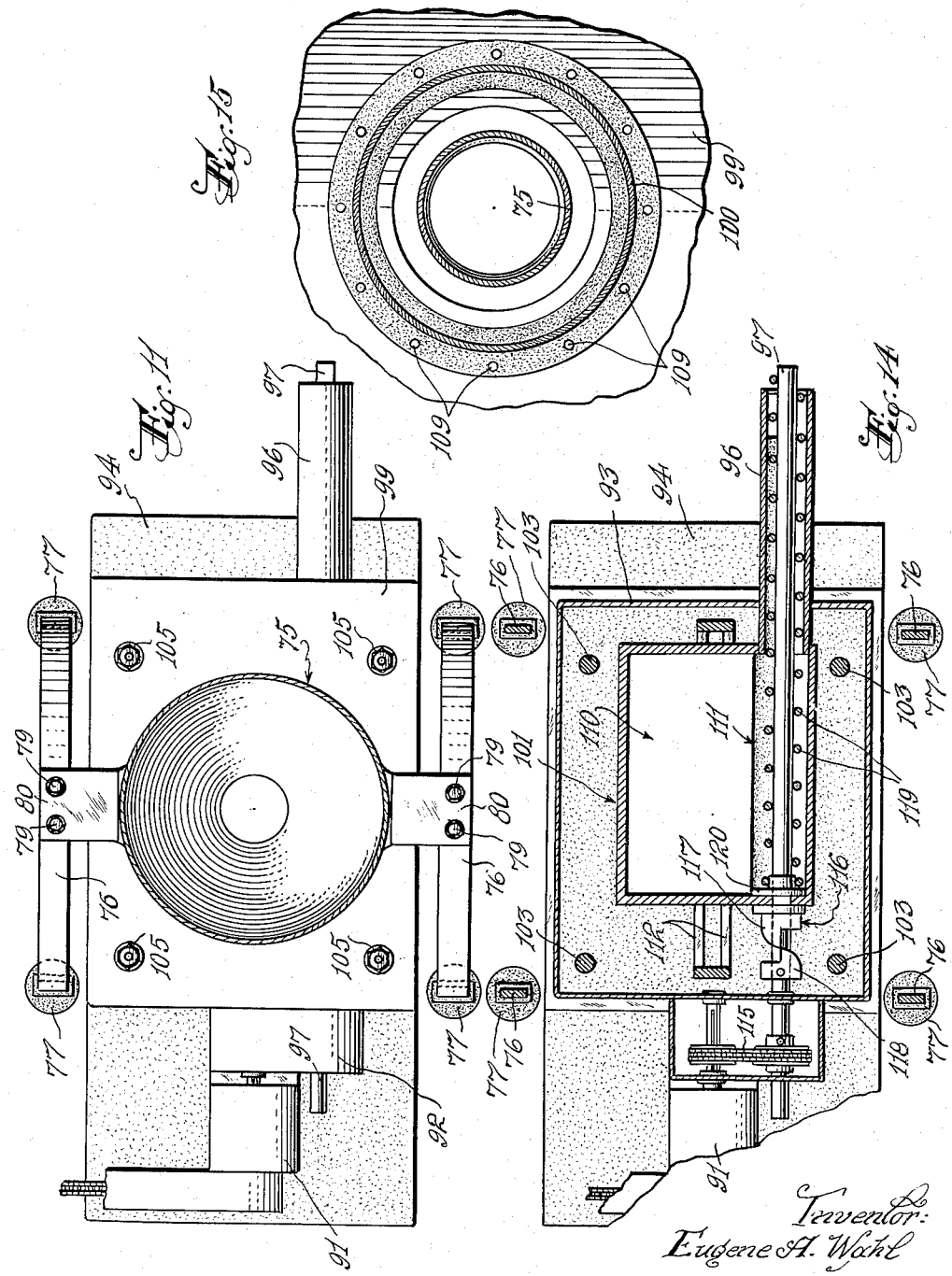

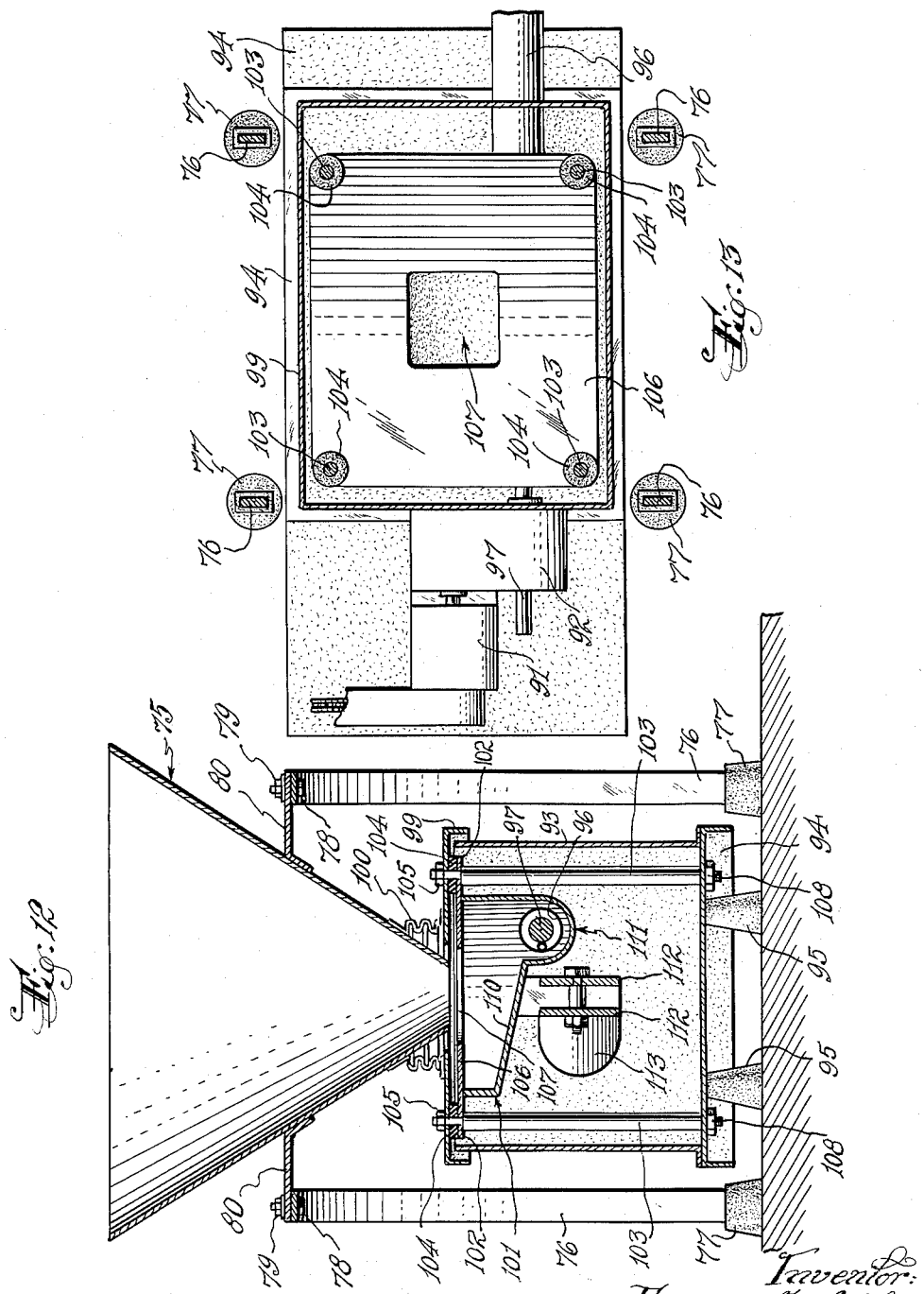

United States Patent Office 2,988,249
Patented June 13, 1961

2,988,249
POWDER FEEDER
Eugene A. Wahl, 294 Forest Road, Glen Ridge, N.J.
Filed Nov. 6, 1956, Ser. No. 620,720
7 Claims. (Cl. 222—404)

This invention relates to automatic powder-feeding apparatus and more particularly to novel apparatus for continuously feeding powdered and granular materials into a medium or container at an accurate, predetermined rate.

Material feeding apparatus of the type to which this invention is directed, is employed to discharge or dispense measured quantities of a powdered, granular, etc., material at a uniform rate. Such materials have widely-different flow characteristics, such as, for example, free-flowing granular dry powders and sticky, amorphous powders. Also powders of the same composition have, under practical conditions, widely varying densities. These variables affect the operating accuracy of the dispensing apparatus and heretofore apparatus of this class could not be relied upond to maintain an accurate, constant rate of discharge better than 5 percent. In my co-pending United States patent applications Serial No. 416,794, filed March 17, 1954, now Patent No. 2,800,252, dated July 23, 1957, and Serial No. 462,860, filed October 18, 1954, I disclose powder-feeding apparatus capable of dispensing granular and powdered materials at a uniform rate with a constant accuracy far better than that of existing such apparatus. In the apparatus disclosed in my prior filed applications, a rotating and continually-vibrated auger, or screw, is utilized, as the dispensing element. Such vibrated auger feeders are capable of discharging free-flowing and most sticky materials at a constant, uniform rate.

However, some substances, such as, zince stearate and titanium dioxide, have a tendency to adhere even to vigorously vibrated surfaces thereby changing the metering, or discharge, rate. This problem has been one of long standing in the plastics industry where zinc stearate must be metered into the process in a continuous, uniform stream at a very low feed rate, generally of the order of one ounce per hour. Apparatus made in accordance with this invention provides a practical solution to this problem.

An object of this invention is the provision of powder-feeding apparatus capable of dispensing sticky materials at a constant rate.

An object of this invention is the provision of powder-feeding apparatus comprising a rotatable auger that is subjected to continuous vibration during rotation thereof and including means applying a mechanical impact to the rotating auger at predetermined intervals.

An object of this invention is the provision of powder-feeding apparatus comprising a rotatable auger, means continuously vibrating the auger during rotation thereof and means causing a mechanical impact to be applied to the auger substantially along the auger axis and at regular intervals.

An object of this invention is the provision of material-feeding apparatus comprising a storage hopper for the material, an auger receiving material from the hopper, means for rotating the auger whereby the material is propelled along the auger for discharge at the auger end, means continuously vibrating the auger during rotation thereof, and means for applying to the auger axial impacts at a frequency related to the speed of auger rotation.

These and other objects and advantages will become apparent from the following description when taken with the accompanying drawings illustrating several embodiments of this invention. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a central, cross sectional view showing a powder-feeding apparatus made in accordance with this invention;

FIGURE 2 is a transverse, sectional view taken along the line II—II of FIGURE 1;

FIGURE 3 is a transverse, sectional view taken along the line III—III of FIGURE 1;

FIGURE 4 is a fragmentary, sectional view showing the lower portion of the hopper and with the auger rotated 90°;

FIGURE 5 generally is similar to FIGURE 1 but showing another embodiment of the invention;

FIGURE 6 is a fragmentary, axial sectional view of the discharge end of the apparatus and showing another embodiment of the invention;

FIGURE 7 is a transverse, sectional view taken along the line VII—VII of FIGURE 6;

FIGURE 8 is similar to FIGURE 1 and showing another arrangement for applying periodic mechanical impulses to the auger;

FIGURE 9 is a side elevation, with parts in section, of a horizontal powder-feeding apparatus embodying the invention;

FIGURE 10 is a side elevation of a horizontal feeder incorporating another embodiment of this invention;

FIGURE 11 is a top plan view of the apparatus shown in FIGURE 10;

FIGURE 12 is a vertical sectional view taken along the line XII—XII of FIGURE 10;

FIGURE 13 is a horizontal sectional view taken along the line XIII—XIII of FIGURE 10;

FIGURE 14 is a horizontal sectional view taken along the line XIV—XIV of FIGURE 10;

FIGURE 15 is a horizontal sectional view taken along line XV—XV of FIGURE 10.

FIGURE 16 is a fragmentary view, with parts in cross section showing another embodiment of the invention; and FIGURE 17 is an isometric view of the cam member used in the FIGURE 16 arrangement.

Reference is now made to FIGURES 1 to 4, particularly FIGURE 1, wherein there is shown a hopper 10 that is supported in fixed position on a suitable base (not shown) as by the supports 11. The lower portion of the hopper terminates in a uniform diameter tube 12 the free end d of which constitutes the discharge opening of the apparatus. In order to provide a hopper of increased capacity the upper portion may be extended as by the wall 13. Spanning the hopper are a plurality of cross bars, or webs 14, said cross bars being rigidly secured to the hopper wall, as by welding, and supporting a bearing bushing 15 that is axially aligned with the axis of the tube 12. A shaft 16 is rotatable in the bearing 15 by means of a chain 17 passing through an opening in the hopper wall 13 and over a sprocket 18 secured to the shaft 16. Although not shown in the drawing, the belt 17 is driven by a constant speed motor.

A cup-like shell 18a, having an open bottom, is secured to the shaft 16 by the nuts 19, 20, the lower portion of the shaft being threaded for this purpose. Secured to the outer surface of the shell is a triangular agitator 21, as best shown in FIGURE 4, said agitator serving to prevent a bridging of the powder at the neck of the hopper, as will become more apparent as the description proceeds. The propelling member for moving material from the hopper to the discharge opening of the apparatus at a uniform feed rate comprises a spring 22 having its upper convolution welded to a bushing 23 which is, in turn, secured in fixed position on the shaft 16 as by the set screw 24. It will be apparent, now, that rotation of the shaft 16 results in a corresponding rotation of the agitator 21 and the propelling, or feed spring 22. It will be seen, then, that the feed spring 22 is positively, definitely, rotatably driven upon rotation of the shaft 16. The agitator being of triangular shape, rotation thereof causes the two triangular ends *a* and *b* to sweep along two levels of the hopper wall, thereby facilitating the proper flow of the material from the hopper proper into the tube 12 and between convolutions of the feed spring 22. Rotation of the feed spring propels the material to the discharge opening *d* of the apparatus. The rate at which the material is discharged is a function of the speed of rotation of the feed spring, the dimensions of the spring and the spacing of the spring convolutions. It may here be pointed out that the outside dimension of the spring 22 is such that the spring fits nicely within the tube 12 thereby preventing an undesirable downward escape of the material between the spring 22 and the inner wall of the tube 12.

A pin 26 passes through diametrically-opposed holes formed in the lower end of the tube 12, said pin also passing through a tight-fitting hole formed in the upwardly-extending rod 27. Suitable means, such as cotter pins 28 retain the pin 26 in position. The diameter of the rod 27 corresponds to the inside diameter of the feed spring 22 and the length of the rod is such that the upper end extends into the hopper 10 but is spaced from the shaft 16. Since the upper end of the feed spring 22 is secured to the shaft 16, rotation of this shaft causes the spring to rotate about the rod 27 thereby propelling the material from the hopper to the discharge end of the apparatus. It will be noted that the lower end of the feed spring 22 normally is disposed below the pin 26. Inasmuch as the upper end of the spring is secured to the shaft 16, rotation of the spring will cause an axial compression of the lower spring convolutions, particularly the lowermost convolution, as the lower, free end of the spring rides up on the pin 26. Further rotation of the spring will bring such spring end free of the pin whereby the spring end snaps suddenly to its normal, free position. Such compression and snap expansion of the spring results in a jump action imparting a mechanical shock to the spring as a whole and it is this impact, primarily effective along the axis of the spring, which shakes loose the sticky material which would otherwise adhere to the contacted surfaces.

As disclosed in my above-referenced co-pending applications, it is necessary to continuously vibrate the feed-spring in order to maintain a highly precise and uniform rate of powder discharge from the apparatus. In the present instance such continuous vibration is provided by means of a suitable electro-magnetic vibrator 29 mechanically coupled to the hopper. Vibrations applied to the hopper are transmitted to the feed spring through the webs 14 and the shaft 16. While the combination of constant feed-spring rotation and continuous vibration of the spring is satisfactory for feeding most powdered and granular materials at a precise, highly accurate rate, certain very sticky materials have a tendency to adhere to the spring and cooperating surfaces in spite of the vibrations applied to the spring. I have found that a mechanical shock applied periodically during spring rotation, as occurs in the FIGURE 1 arrangement, is sufficient to overcome the adhesive character of the material and maintain a uniform rate of discharge of the material from the discharge end *d* of the apparatus. Although in the FIGURE 1 arrangement two mechanical impacts are applied for each full rotation of the spring it will be apparent that by terminating one end of the pin 26 within the rod 27 only one impact per spring revolution will result. Either arrangement is satisfactory for use in a practical feeder.

Reference is now made to FIGURE 5 wherein the material-propelling member comprises an auger consisting of a central rod 31 and integral, outwardly-extending flights 32. The upper end of the auger rod 31 is threaded to accept the internally-threaded bushing 32 which bushing is also threaded on to the drive shaft 16′, the latter passing through the bearing bushing 15′ that is secured in proper position by the cross-bars, or webs 14. The bushing 32 is also externally-threaded to accommodate the nuts 19 and 20 that secure the cup member 18a in place. Secured to the nut 19 is a shallow cup-like member 33 and a similar cup-like member 34 is secured to the lower end of the bearing bushing 15′. Loosely disposed about the drive shaft 16′ and confined between the members 34, 33 is a compressing spring 35.

A cap member 36 is secured in fixed position on the bearing bushing 15′ by means of a set screw 37, such cap member having its upper surface 38 formed as a cam, that is, the surface rises gradually to the point X at which point the surface drops axially of the drive shaft to the flat surface Y. Secured to the pulley 18 is a cam member 40 having a reversely-disposed cam surface complementary to the cam surface of the cap member 36. Hence, upon rotation of the pulley 18 and shaft 16′, the complementary cam surfaces will cause the pulley and drive shaft to rise until the point X is reached whereupon the pulley and drive shaft fall sharply. Since the auger is secured to the drive shaft, the auger will rise slowly and drop sharply once per each revolution of the auger. Such mechanical impact applied to the auger, and which is accentuated by the compression spring 35, serves the same purpose as the jump-action, feed-spring shown in the FIGURE 1 embodiment of the invention, namely, to overcome adherence of the sticky material to the surfaces of the auger and/or inner wall of the tube 12. There is thus maintained a uniform discharge rate of the material from the discharge end *d* of the machine. Obviously, the cooperating cam surfaces can be arranged to provide two or more impacts to the auger per auger revolution.

The cooperating cam surface members 38 and 40, shown in FIGURE 5, as well as the compression spring 35 can be replaced by an arrangement such as that shown in the fragmentary view of FIGURE 6 and the transverse sectional view of FIGURE 7. Here, a spring element 42 has one end secured to the lower end of the auger rod 31 with the other end (free end) lying below the pin 26 passing through diametrically-aligned holes in the tube 12. As has been explained with reference to FIGURE 1, rotation of the auger causes the free end of the spring member to ride up on the pin 26 resulting in a corresponding compression of the spring member and then a rapid expansion to normal position as the spring end rides free of the pin.

A further modification of the FIGURE 5 arrangement is shown in FIGURE 8. The compression spring (spring 35 in FIGURE 5) has been dispensed with and a mechanical impact of predetermined magnitude is imparted to the auger by reason of the weight 43 carried by the pulley. Upon auger rotation, the cooperating cam surfaces of the cam members 38 and 40 cause the weight and auger to rise relatively slowly and drop sharply once per auger revolution. Under some conditions of machine operation it is preferable to apply the mechanical shock at the discharge opening *d* of the machine. In such case the pin 26 is passed through the walls of the tube 12 and the end of the auger rod 31 normally rests upon such pin. Specifically, the distance W representing the maximum rise of the cam member 38 is somewhat more than the distance V representing the maximum distance between the end of the auger rod 31 and the upper surface of the pin 26. Consequently, upon the downward drop of the auger, the rod 31 will strike the pin 26 as distinguished from the rise of the cam member 40 striking the flat, horizontal portion of the cam member 38.

The principle of my invention also is applicable to horizontal feeders as shown in FIGURE 9. The hopper 10' and vibrator 29 are supported on a base 45, in any suitable manner, not shown. The discharge opening of the hopper is disposed within a trough 46 having a flat bottom portion 47 and a sloping bottom portion 48, the latter being disposed below and spaced from the hopper opening. Also secured to the base 45 is a supporting block 49 carrying an electro-magnetic vibrator 50. The vibrator comprises a driving coil 51 carried by a soft-iron member 52 that is secured at one end to a soft-iron frame 53. Those skilled in this art will understand that when the coil 51 is energized by an alternating current corresponding mechanical vibrations will be imparted to the trough 46 that is carried by the vibrator frame 53 and secured thereto as by the bolts 54. An auger 55 is disposed within a tube 56 passing through the trough 46, said tube being secured in fixed position relative to the trough as by the screws 57. The ends of the tube 56 are closed by end plates 58, 59 which serve as bearing members for the auger. A portion of the tube wall is cut away to form the discharge opening $d'$ of the apparatus and another portion of the tube wall is cut away to provide an entrance for the passage of the material from the trough to the auger. A cam member 60 is secured in fixed position to the bearing member 59 and the auger shaft 61 extends through such member and has secured thereto a pulley 62. An electric motor 63 having a pulley 64 secured to its shaft rotates the auger at a predetermined, constant speed through the belt 65. The sprockets and drive chain may be enclosed within a housing 66. A second cam member 67 is secured to the auger shaft, as by a set screw, the face of such cam member cooperating with the face of the cam member 60 to impart an axial impact to the auger upon auger rotation, as has been described with reference to FIGURE 5. A cup-shaped member 70 is secured to the auger shaft and is slidable within a similar cooperating member 71, said members forming an enclosure for the spring 72. Upon axial movement of the auger to the left, by reason of the action of the cam members 60, 67, the spring 72 is compressed, and when the surfaces of the cam members pass the point of maximum rise, the spring expands thereby imparting a sharp impact to the auger.

The horizontal feeder arrangement shown in FIGURE 9 offers important advantages. Under the action of auger rotation and vibration the height of the powder in the trough will build up at the discharge end of the apparatus. Such powder height will reach a maximum value and will remain substantially constant whereby the density of the material fed to the auger is also constant thereby promoting a more accurate rate of discharge of the material from the discharge opening $d'$. Also, the level of the material in the trough controls the rate at which powder passes into the trough from the hopper. Still further, the tube 56 and auger assembly is readily removable from the trough, by merely loosening the screws 57, for cleaning purposes or replacement by an auger having flights of different pitch.

A modification of the horizontal feeder apparatus is shown in FIGURES 10–15. With specific reference to FIGURES 10 and 11, the hopper 75, having attached thereto an electro-magnetic vibrator 29, is supported on a flat surface by means of a pair of curved, metal bands 76, each such band being provided with a rubber foot 77. Secured to the central, or uppermost, portion of each band, as by the bolts 78 and nuts 79, are laterally-extending webs 80, each web having an offset end welded to the outer surface of the hopper, see also FIGURE 12. A speed-changing unit 91, a housing 92 enclosing the necessary pulleys and drive belt, and a housing 93 are supported on a base 94, which base is also provided with rubber feet 95. As will be described in detail hereinbelow with specific reference to FIGURE 12, a trough is disposed below the hopper and within the housing 93, said trough having a tube 96 extending therefrom and outwardly of the housing. The tube 96 has a portion of the wall cut away to form the discharge opening $d'$ of the apparatus. Upon rotation of the auger rod 97 powder is propelled from the trough through the discharge opening $d'$ and into a suitable receptacle 98. In order to prevent the entrance of dust and other deleterious matter into the powder the trough-housing 93 is provided with a cover 99 having secured thereto a flexible, bellows-type boot 100 which frictionally encircles the lower portion of the hopper. Although not shown in the drawings, the top of the hopper may also be closed by a suitable cover.

Reference is now made to FIGURE 12 which is a vertical sectional view taken along the line XII—XII of FIGURE 10. Here is shown the trough 101 having outwardly-extending flange portions 102. Each flange portion is provided with properly positioned holes so that the trough is supported on the shoulders of supporting posts 103. Disposed between the flange portions of the trough and the cover 99 are rubber washers 104, and the assembly is secured by means of nuts 105 operating on the reduced-diameter, threaded portions of the supporting posts 103. Attention is directed to the fact that the trough also includes an inwardly-extending top plate 106 having an opening 107 formed therein and aligned with the bottom opening of the hopper. The lower ends of the supporting posts 103 are similarly provided with reduced-diameter, threaded ends which pass through holes formed in the top surface of the base 94 and accept the fastening nuts 108. The upper end of the flexible boot 100 engages the outer wall of the hopper and the lower end includes an outwardly-extending flange whereby the boot may be secured to the cover 99 by rivets 109, as shown in FIGURE 15. It will be clear that powder flows from the hopper into the trough through the enlarged openings in the cover 99 and the trough plate 106.

As shown in FIGURE 12, the bottom of the trough includes an inclined portion 110 terminating in a circular portion 111. The tube 96, which extends from the trough, has an end welded, or otherwise, secured to an end wall of the trough. An electro-magnetic vibrator 113 is bolted to longitudinally-extending bars 112 that are rigidly secured to the inclined bottom portion of the trough, as by welding. It is here stressed that the vibrations imparted to the trough by the vibrator 113 are in a direction normal to the axis of rotation of the auger rod 97. This is important in feeder apparatus designed to discharge material at a very low rate and particularly when the material propelling member is a hollow feed screw, that is, one without a central rod. In such apparatus axial vibration of the feed screw may result in a minute discharge of the material even when the feed screw is not rotating. It will be apparent that in the described arrangement the hopper and the trough are independently vibrated by separate vibrators. Since the hopper and its supports are vibrationally isolated from the rest of the apparatus, vibration of the hopper does not interfere with or affect the vibrations of the trough.

Reference is now specifically made to FIGURE 14 which is a horizontal sectional view taken along the line XV—XV of FIGURE 10. Here are shown the inclined portion 110 and the circular portion 111 of the trough bottom. The auger rod 97 passes through the tube 96 and the circular portion of the trough, said rod being rotatable at a selected, constant speed by the belt 115 from the gear unit 91. The rod is journaled for rotation in a bearing 116 that is secured to the outer end wall of the trough, said bearing having a cam surface portion 117 co-acting with a complementary cam member 118 that is secured to the auger rod 97. The material-propelling member is a helical spring 119 having its outer end firmly-secured to the rod 97 and its inner end abutting a thrust bearing member 120 that is secured to the inner wall of the trough. It will be apparent that the spring 119 will rotate with the rod 97 and in so rotating will propel material from the trough, through the tube 96 and out of the discharge opening at the end of the tube. During rotation of the rod 97 the inner end of the spring 119 will remain in sliding contact with the thrust bearing member 120 at all times. However, the co-acting cam members will cause the rod to be moved axially to the left until the point of maximum cam rise is reached thereby compressing the spring. When the co-acting cam surfaces pass the point of maximum rod displacement spring suddenly will expand to its normal length thereby moving the rod to the right to an extent defined by the form of the cam surfaces. Accordingly, a sharp mechanical impact is effective upon the rod and the spring to thereby prevent continued adhesion of the material to the surfaces of the rod, spring or tube 96. The magnitude of such impact is determined by the characteristics of the material of which the spring is formed and the extent of the rise on the cam members. The number of impacts, for each revolution of the rod-spring, is, of course, determined by the number of rises on one or both of the cam members.

In the construction shown in FIGURES 10-15 the material-propelling spring is gradually compressed, upon rotation of the spring, and then rapidly expanded to provide the mechanical impact. A reverse operation of the spring is shown in the arrangement of FIGURE 16. Here, a hollow, helical spring 120, that is, one without a center rod, extends along the bottom of the trough 121 and substantially through the tube 122, said tube having a powder-discharge opening 123 formed therein. Secured to the open end of the tube 122, as by a set screw 124, is a collar, or cam member 125. Such cam member better shown in FIGURE 17, has one end formed to provide two rising surfaces each of which terminates in an axial plane. One end of the spring 120 encircles a plug 126 and is soldered thereto, said plug having a radial pin 127 extending therefrom. The other end of the spring is similarly secured to an enlarged-diameter portion 128 of the shaft 129, said shaft passing through a bearing member 130 secured to the end wall of the trough by screws 131 and carrying the drive pulley 132. Rotation of the pulley causes a simultaneous rotation of the shaft 129, spring 120 and plug 126. Such rotation causes the pin 127 to rise up on the inclined end surface of the cam member 125 thereby elongating the spring. Spring tension will cause the pin to drop sharply when the pin passes the point of maximum rise thereby imparting a mechanical impact to the spring. Secured to the trough is an electro-magnetic vibrator 133 arranged to continuously vibrate the trough and spring in a direction normal to the spring axis. It will here be noted that in all of the embodiments of my invention the auger, or spring feed screw is connected to the motor driving the same through unyielding connecting means whereby the said auger, or spring screw, is positively driven by the said motor or driving means.

From the above description, it will be seen that I have provided feeder apparatus for continuously dispensing a measured quantity of material per unit of time. The feeding rate of the apparatus is maintained constant, at a high degree of accuracy even when the material is a sticky substance which, so far as I am aware, cannot be handled with prior apparatus of this class. In the case of sticky materials, the constant, high accuracy, feed rate is possible because of the mechanical impacts periodically applied to the material-propelling member, which member is continuously vibrated during rotation.

Having now described several embodiments of my invention those skilled in this art will have no difficulty in making certain changes and modifications in order to meet particular operating conditions. Such changes and modifications may be made without departing from the scope and spirit of the invention as set forth in the following claims.

I claim:
1. Apparatus for feeding powdered material at a predetermined constant rate, comprising a container for the material, a spiral spring feed screw having a receiving portion for receiving powder from the container and a discharge portion, means positively rotating the feed screw to propel the material to the said discharge portion, and means imparting periodic sharp mechanical impacts to the said feed screw.

2. The invention as recited in claim 1, wherein the mechanical impacts are applied substantially along the rotation axis of the feed screw.

3. The invention as recited in claim 1, wherein the means imparting the mechanical impacts to the feed screw comprises cooperating cam members effective upon rotation of the feed screw to displace said feed screw along its axis of rotation.

4. The invention as recited in claim 1, wherein the means imparting periodic impacts comprises a relatively fixed member disposed in the circular path of travel of one end of said spring.

5. The invention as recited in claim 1, wherein said spiral spring feed screw has one end secured to a rod that is encircled by the spring, and the means imparting mechanical impacts comprises cooperating cam members effective upon rotation of the rod to axially compress the spring.

6. In powder-feeding apparatus of the class including a positively driven rotatable spiral spring field member for propelling the powder toward one end thereof, the improvement comprising means imparting sharp periodic mechanical impacts to the rotatable member during rotation thereof, and means continuously vibrating the rotatable member.

7. Powder feeding apparatus comprising a storage hopper for the powder; a trough disposed to receive powder from the hopper; a tube extending from an end wall of the trough; a spiral spring feed screw extending through the said tube and into the trough; means positively rotating the feed screw; and means effective upon rotation of the feed screw to momentarily expand the feed screw in an axial direction.

References Cited in the file of this patent

UNITED STATES PATENTS

| | | |
|---|---|---|
| 2,067,583 | Stark | Jan. 12, 1937 |
| 2,366,075 | Weyandt | Dec. 26, 1944 |
| 2,386,991 | Thomas | Oct. 16, 1945 |
| 2,541,742 | Booth | Feb. 13, 1951 |
| 2,765,899 | Ballard | Oct. 9, 1956 |
| 2,800,252 | Wahl | July 23, 1957 |